United States Patent [19]

Mendelsohn et al.

[11] Patent Number: 4,604,940
[45] Date of Patent: * Aug. 12, 1986

[54] HIGHLY RESILIENT POLYURETHANE ELASTOMER

[75] Inventors: Morris A. Mendelsohn, Wilkins Twp., Allegheny County; Francis W. Navish, Jr., East Pittsburgh, both of Pa.

[73] Assignee: Westinghouse Electric Corp., Pittsburgh, Pa.

[*] Notice: The portion of the term of this patent subsequent to Dec. 4, 2001 has been disclaimed.

[21] Appl. No.: 707,111

[22] Filed: Feb. 28, 1985

[51] Int. Cl.⁴ .................. F41F 3/04; C08G 18/32
[52] U.S. Cl. ................... 89/1.816; 528/65; 528/66
[58] Field of Search .......... 528/65, 66; 89/1.816

[56] References Cited

U.S. PATENT DOCUMENTS

| | | | |
|---|---|---|---|
| 3,124,040 | 3/1964 | Fiedler | 277/199 |
| 3,857,321 | 12/1974 | Cohen | 89/1.81 |
| 3,933,725 | 1/1976 | Dearlove et al. | 260/33.6 |
| 4,321,333 | 3/1982 | Alberino et al. | 528/66 |
| 4,357,855 | 11/1982 | Merz | 89/1.816 |
| 4,399,999 | 8/1983 | Wold | 277/199 |
| 4,433,848 | 2/1984 | Williams | 277/199 |
| 4,485,719 | 12/1984 | Mendelsohin et al. | 89/1.816 |

OTHER PUBLICATIONS

*I&EC Product Research & Development*, "Polymer Composition and Structural Design", M. A. Mendelsohn et al., vol. 10, Mar. 1971, pp. 14–25.

*I&EC Product Research & Development*, "Chemical and Engineering Properties of Polyurethane Isolater Pads", M. A. Mendelsohn et al., vol. 14, Sep. 1975, pp. 181–189.

*Resins for Aerospace*, C. A. May Ed., A.S.C. Symposium Series 132, American Chemical Society, 1980, chapters 14–15.

Primary Examiner—Herbert S. Cockeram
Attorney, Agent, or Firm—Daniel P. Cillo

[57] ABSTRACT

A resilient polyurethane elastomer structural member is made from (A) a prepolymer prepared from a composition consisting essentially of 2.60 moles to 2.80 moles of 4,4'-diphenylmethane diisocyanate, and about 0.23 mole to about 0.31 mole of a low molecular weight triol, per 1.0 mole of polyoxytetramethylene glycol, and (B) hydroquinone di-(β-hydroxyethyl) ether, as a chain extender. This polyurethane elastomer can be used to make annular missile shock isolator pads useful for the land based, MX (Peacekeeper) missile.

9 Claims, 3 Drawing Figures

HIGHLY RESILIENT POLYURETHANE ELASTOMER

GOVERNMENT CONTRACT

The Government has rights in this invention pursuant to Contract No. F04704-82-C-0017 awarded by the U.S. Department of Defense.

BACKGROUND OF THE INVENTION

Elastomeric materials have long been used to make shock isolator pads for missiles. The shock isolator pads usually employ prebuckled struts to support the missile in its launch tube, provide shock mitigation, and damp vibrations. Tolylene diisocyanate terminated polyoxytetramethylene based prepolymers, such as Adiprene L-100 or L-167, extended with 4,4'-methylenebis(orthochloroaniline)-MOCA- have been used in the manufacture of these structural members, as taught by Mendelsohn et al. in *I&EC Product Research & Development*, Vol. 10, p. 14-25, March 1971 and Vol. 14, p. 181-189, September 1975, and by Meier et al. in *Resins for Aerospace*, C. A. May Editor, ACS Symposium Series 132, American Chemical Society, Chapters 14 and 15, Washington, 1980. Both the tolylene diisocyanate and the 4,4'-methylenebis(orthochloro-aniline), however, are now believed to present severe toxicologic problems.

Mendelsohn et al., in U.S. Pat. No. 4,485,719, filed on Apr. 8, 1982 provided substitutes for these materials, utilized in a high modulus, highly rigid missile launch seal, or in certain types of stiff shock isolator pads. The polyurethane used was a cured admixture of from about 5.0 to 5.4 parts by weight prepolymer per 1 part by weight chain extender, where the prepolymer was made from about 3.1 to 3.4 moles of 4,4'-diphenylmethane diisocyanate; and about 0.22 to 0.32 mole of low molecular weight triol, per 1 mole of polyoxytetramethylene glycol. In most situations, such a formulation, while very appropriate for missile launch seals, was too rigid for most shock isolator pad use. Thus, there is a need for substitute polyurethane elastomers that can be utilized in the manufacture of highly flexible shock isolator pads that will be in circumferential contact with launchable missiles.

SUMMARY OF THE INVENTION

The above problems have been solved, and the above needs met, by providing a very resilient, extensible, crack resistant, polyurethane elastomer, made from materials which present no toxicologic problems. This polyurethane elastomer can be used to make annular missile shock isolator pads especially useful for the land based, MX (Peacekeeper) missile.

The polyurethane elastomer is a specifically formulated material consisting essentially of the cured admixture of (A) about 6.6 parts to 7.2 parts by weight of a polyurethane prepolymer made from 2.60 moles to 2.80 moles of 4,4'-diphenylmethane diisocyanate; and about 0.23 mole to about 0.31 mole of a low molecular weight triol; per 1.0 mole of polyoxytetramethylene glycol and (B) 1.0 part by weight of a hydroquinone di-(β-hydroxyethyl)ether, used as a sole chain extender. The prepolymer and chain extender are both preferably degassed, heated, admixed, and poured into a heated mold at between about 100° C. and 120° C. After removal from the mold, the polyurethane elastomer may be post-cured. With this composition, mold dwell time is very low, adding to the economics of processing, and the resiliency of the molded resultant shock isolator pads is outstanding.

BRIEF DESCRIPTION OF THE DRAWINGS

For a better understanding of the invention, reference may be made to the preferred embodiment, exemplary of the invention, shown in the accompanying Drawings in which.

DESCRIPTION OF THE PREFERRED EMBODIMENTS

Figure 1:
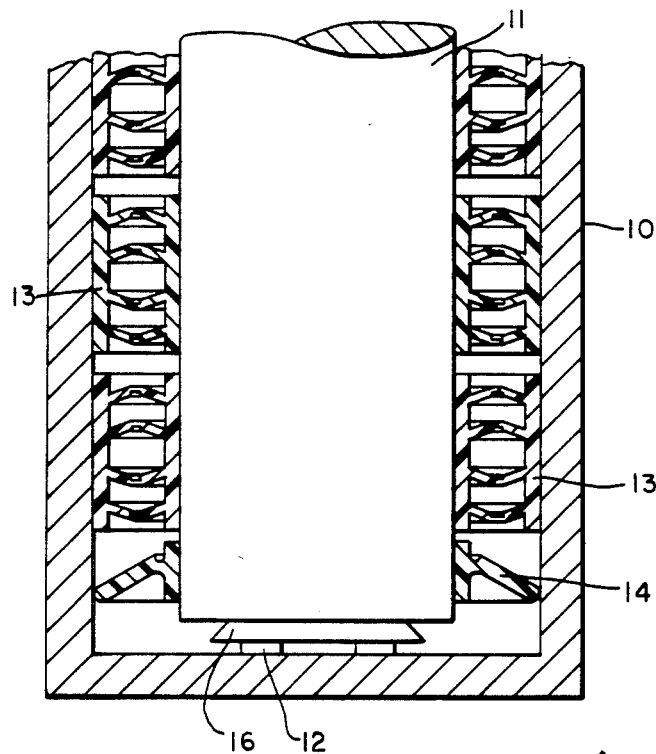
FIG. 1 shows a schematic illustration of missile mounted isolator pads and launch seals in circumferential contact with a missile and a launch tube, where the missile is at rest.

Reaction of an isocyanate and an alcohol results in the formation of a urethane:

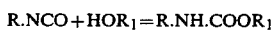

$$R.NCO + HOR_1 = R.NH.COOR_1$$

By the same reaction, polyhydroxy materials will react with polyisocyanates to yield polyurethanes. These polyurethanes are well known in the art, and a detailed description of their synthesis can be found in *Plastics Materials*, by J. A. Brydson, D. Van Nostrand Co., 1966, pp. 484 to 504.

The isocyanate used is 4,4'-diphenylmethane diisocyanate, i.e., p,p'-diphenylmethane diisocyanate. This is the only isocyanate useful in the elastomer. It has an extremely low vapor pressure, about 1/10 that of tolylene diisocyanate, and is thus much less hazardous. It also adds much more resiliency and has a higher recovery after distortion than tolylene diisocyanate, because of its molecular symmetry.

The polyol used is polyoxytetramethylene glycol, a dihydric alcohol, i.e., HO$-(CH_2CH_2CH_2CH_2-O)_n-$H, where n has an average value of 12 to 15. This material is also a polyether. It also adds to the resilience of the elastomer. Both polyoxyethylene glycols and polyoxypropylene glycols are not useful in the elastomer, because of their inferior resilience characteristics, and inferior oxidative stability at moderate and elevated temperatures. Polyesters cannot be used because of their inferior hydrolytic stability.

A low molecular weight triol, having from 5 to 8 carbon atoms, selected from the group consisting of trimethylol pentane, trimethylol butane, trimethylol ethane and preferably trimethylol propane, is used to improve cure and shorten mold dwell time. The preferred trimethylol propane, $C_2H_5C(CH_2OH)_3$, has all three hydroxymethyl groups attached to the same carbon atom. Materials that cannot be used for this purpose include, for example, glycerol, and other polyols containing secondary and tertiary hydroxyl groups, which impart inferior thermal and hydrolytic stability. The use of the specific materials heretofore described as useful, is critical in providing effective resilience in the elastomer, and substitution will severely degrade the final product.

In preparing the urethane prepolymer, the 4,4'-diphenylmethane diisocyanate (MDI) is melted, if stored in a frozen condition, and brought up to a temperature of between about 40° C. and 50° C. It is then placed in a kettle with an agitator, under a blanket of dry nitrogen gas. With the kettle agitator running, the triol is added to the kettle. Polyoxytetramethylene glycol is melted, if stored in frozen condition, and brought up to a temperature of between about 20° C. and 50° C., after which it is added to the stirred material in the kettle, at such a rate that the temperature of the reacting material does not exceed 75° C. The contents of the kettle are then stirred under dry nitrogen at 70° C. to 80° C. for about 1 hour, to form a polyurethane prepolymer. The prepolymer is then degassed for up to about 5 minutes at about 5 Torr at 70° C. to 80° C. The polyurethane prepolymer can then be stored at low temperature, as long as it is not permitted to come into contact with ambient air, because it reacts with moisture.

Hydroquinone di-($\beta$-hydroxyethyl)ether (HQEE) is used as the sole chain extender. The aromatic structure of this material gives the elastomer moderate rigidity, while allowing the use of polyurethane prepolymer systems that don't have an extremely low isocyanate equivalent weight. This material also provides low shrinkage properties. The use of a single extender adds to the simplicity and commercial viability of the process. Materials such as ethylene glycol, propylene glycol, and the various isomeric butanediols, pentanediols, and hexanediols, and the like, are not suitable because they would require lower equivalent weight prepolymer to obtain the desired modulii and thus cause a greater exothermic heat of reaction, which would cause reproducibility problems, along with greater shrinkage and resultant cracks. Even hydroquinone, by itself, is not useful in the elastomer, because its aromatic hydroxyl groups impart inferior thermal and hydrolytic stability.

In order to add the HQEE, used as a chain extender, to the polyurethane prepolymer, the HQEE is brought up to a temperature of between about 140° C. and 150° C., and then degassed at under about 5 Torr for about 5 minutes. It is then dropped to a temperature of between about 123° C. and 127° C. Concurrently, the polyurethane prepolymer, made as heretofore described, is brought up to a temperature of between about 110° C. and 115° C. and degassed at under about 5 Torr for about 6 minutes. It is then dropped to a temperature of between about 98° C. and 102° C., at all times being protected from atmospheric moisture. The HQEE, which is between about 120° C. and 130° C., is then thoroughly mixed with polyurethane prepolymer, which is between about 100° C. and 120° C. If the HQEE temperature is below 120° C., there will be a lack of homogeneity in the mixture and HQEE may precipitate.

Mixing of the prepolymer with the extender can be performed with a casting machine or with an air or electro-powered mixer. Thorough mixing can be accomplished in about 1 minute, with the resultant mixture being essentially free of bubbles and striation lines. Immediately after mixing, the admixture is poured into appropriate molds which have been coated with a mold release agent and are at a temperature of between about 100° C. and 120° C. The structural member is then demolded after about 1 hour to 2 hours and placed in a curing oven at a temperature of between about 100° C. and 120° C. for about 12 hours to 18 hours. Thus, mold dwell time is very short and eliminates the high cost of procuring a large number of molds in commercial operation.

Regarding the component materials, the 4,4'-diphenylmethane diisocyanate (MDI) preferably should have an average isocyanate equivalent weight of about 125, and have a maximum total chlorides content of about 0.1%. The triol preferably should have a minimum hydroxyl content of about 37.5% and a maximum water content of about 0.05 wt.%. The polyoxytetramethylene glycol preferably should have a number average molecular weight of about 975 to 1,020, a hydroxyl number of between about 110 to 115, a maximum acid number of about 0.05, and a maximum water content of about 0.03 wt.%. The hydroquinones di-($\beta$-hydroxyethyl)ether (HQEE) preferably should have a hydroxyl number (mg KOH/gram) of between about 545 to 566, and a water content of less than about 0.1 wt.%.

The weight and mole ratio of ingredients is critical in this invention in providing a material of both high flexibility and moderate rigidity, especially useful as shock isolator struts or pads for land based missiles, having appropriate damping and recovery properties. The polyurethane prepolymer is prepared by admixing 2.60 moles to 2.80 moles of 4,4'-diphenylmethane diisocyanate with about 0.23 mole to about 0.31 mole of triol, i.e., preferably trimethylol propane, per 1.0 mole of polyoxytetramethylene glycol. These mole ratio ranges are based on one mole of polyoxytetramethylene glycol, so that actual additive values should be adjusted up or down to provide a portion used with one mole of glycol. This admixture must contain excess diisocyanate, which remains unreacted. If more than 2.80 moles of 4,4'-diphenylmethane diisocyanate are used, the elastomer will be too stiff. If less than 2.60 moles of 4,4'-diphenylmethane are used, the compressive properties of the elastomer drop substantially below a useful range. These addition ranges are critical in providing the right degree of resilience, together with adequate modulus for shock isolator strut applications.

Then, from about 6.6 parts to about 7.2 parts by weight of polyurethane prepolymer, containing free isocyanate, is mixed with 1.0 part by weight of hydroquinone di-($\beta$-hydroxyethyl)ether (HQEE). Both under about 6.6 parts and over about 7.2 parts polyurethane prepolymer per part HQEE, the resulting elastomer will have too low a modulus and be too soft. This range is critical in providing the right degree of resilience, together with adequate modulus for shock isolator strut applications. Furthermore, use of prepolymer above about 7.2 parts per part HQEE will give an unstable material in which the unreacted isocyanate groups could react with atmospheric moisture.

Figure 2:
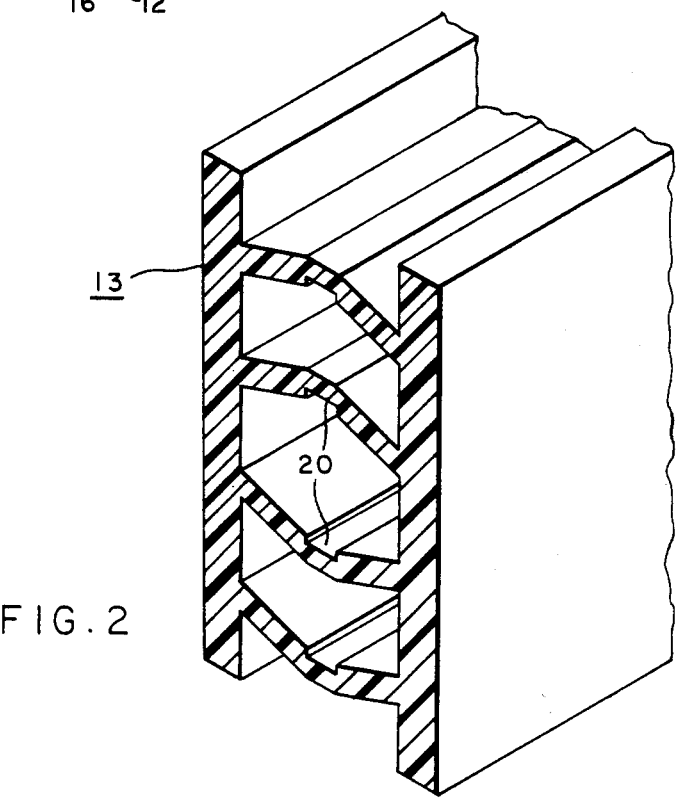
FIG. 2 shows a three dimensional view of a preferred design for the missile shock isolator pads of FIG. 1.

Referring now to FIG. 1 of the Drawings, directed to missile mounted shock pads and also showing pressure seals, a missile launch tube 10 is shown, surrounding a cylindrical launchable missile 11 contained in the tube at rest, and supported against the bottom of the tube by suitable supports 12. Shock isolator pads, shown as 13, in a simple box form with uniform columns, are attached circumferentially around the outer missile surface on separable i.e., ejectable, base plate segments snugly fitting around the missile, and contact the launch tube bore. The isolator pads can be any number of configurations of a prebuckled box design well known in the art, a preferred one of which is shown in FIG. 2. This elastomeric liner material must support the missile in an aligned position, provide shock mitigation, react properly with the missile during launch, and provide vibration-isolation properties compatible with the missile response characteristics.

The launch seals, shown as 14 in FIG. 1, are attached circumferentially around the outer missile surface on separable, i.e., ejectable, base ring segments snugly fitting around the missile, near the bottom firing end 16 of the missile. Both of these structural members span the annular space between the missile and the launch tube and contact both the missile and the launch tube. The launch seals 14 must exhibit sufficient rigidity and strength to retain eject gases during launch, yet must not exert excess frictional drag on the launch tube, usually requiring a completely different set of material properties than the shock isolator pads.

It is to be understood that both the shock isolator pads and launch seals may also be attached to the launch tube that surrounds the missile, presenting a reusable system. There, the missile exits the launch tube, the pads and seal remain, and a new missile may be inserted without changing either the pads or seals. In the missile mounted system shown, both the pads and seals lift off with the missile and are jettisoned by a suitable ejection means after the missile clears the launch tube.

The static and dynamic compression properties of the shock isolator pad liner can be widely varied by changes in mechanical design as well as in the polymer composition. Other characteristics such as damping, pseudoset, recovery, and hydrolytic stability are primarily dependent on the polymer composition. Dynanic compression-deflection properties are determined using a drop-table, where a weight guided by a ball bushing bears against the test specimen. A deflectometer connected to the weight permits the liner deflection under shock to be determined. An accelerometer mounted on the weight permits the dynamic compressive stress to be determined. The deflection and acceleration traces are recorded on an oscillograph. The drop-table height is adjusted to provide the proper initial strain rate.

A shock isolator pad design which provides excellent compression-deflection curves is that shown in FIG. 2 as 13, where a prebuckled structure is shown with notched columns 20. The notch was found to lower the front end relative to the rear end (higher deflection end) of the compression-deflection curve, eliminating a peaked and then flat curve generally found in simple box structures. A more detailed description of typical compression-deflection curves, and the standard test in their measurement, can be found in *I&EC Product Research & Development*, Vol. 10, pp. 14–25, at pp. 16–18, March 1971, herein incorporated by reference.

EXAMPLE

A polyurethane prepolymer was made by mixing 338 grams (1.35 moles) of 4,4'-diphenylmethane diisocyanate (equivalent wt.=125) at about 45° C. with about 18 grams (0.13 mole) of trimethylol propane (equivalent wt.=45) in kettle, equipped with an agitator, under a blanket of dry nitrogen gas. Then about 499 grams (0.5 mole) of polyoxytetramethylene glycol (equivalent wt.=499) having a number average molecular weight of about 1000 g/mole (sold commercially by Q. O. Chemicals Co. as Polymeg 1000) at a temperature of about 45° C. was added to the kettle mixture, at such a rate that the kettle temperature did not exceed 75° C. After addition, the admixture was stirred at about 75° C. for 1 hour to form a polyurethane prepolymer. The mole ratio of (diisocyanate):(glycol):(triol) was (1.35):(0.5):(0.13) or increasing to ratios so that the values are based on 1 mole of glycol, (2.7):(1.0):(0.26).

The polyurethane prepolymer was then heated and degassed, and hydroquinone di-($\beta$-hydroxyethyl)ether was also heated and degassed. Then, 99 grams of the hydroquinone di-($\beta$-hydroxyethyl)ether, at about 125° C., was thoroughly mixed with 688 grams of the polyurethane prepolymer, at about 100° C., in a one-half gallon cylindrical container with a stirrer driven by an air motor for about 1 minute, with the resultant elastomeric mixture being essentially free of bubbles and striation lines. The weight ratio of (prepolymer):(extender) was (688 parts):(99 parts) or (6.9):(1.0).

The elastomeric mixture was then immediately poured into a hollow ladder type pad mold, made of aluminum coated with silicone mold release agent. The mold temperature was about 110° C. After two hours, the formed shock isolator pad liner was demolded and post-cured for an additional 16 hours in an oven at 110° C. The peak exotherm of the composition was about 150° C. After several days at ambient conditions, a specimen about 6.4 inches long and about 2.5 inches wide, having four opposed prebuckled columns, having the design shown in FIG. 2, was used for standard compression-deflection testing. The testing procedure was that set forth in the *I&EC Product Research & Development* article referred to previously.

The ultimate tensile strength was found to be 3860 lb/in$^2$, the ultimate elongation was found to be 300%; and the tear strength (ASTM D624) was found to be 440 lb/in. The pad compression-deflection characteristics were those shown by the curves of FIG. 3, for a strain rate of 2 in/min. where first cycle loading is curve A and second cycle loading is curve B. Additional data was found as follows:

| | Stress (lb/in$^2$) |
|---|---|
| TENSILE STRESS | |
| Elongation (%) | |
| 10 | 860 |
| 20 | 1270 |
| 30 | 1480 |
| 40 | 1640 |
| 50 | 1770 |
| 100 | 2140 |
| 200 | 2630 |
| COMPRESSIVE STRESS | |
| Compressive Deflection (%) | |
| 5 | 640 |
| 10 | 1170 |
| 15 | 1650 |
| 20 | 2210 |
| 25 | 2870 |

Figure 3:
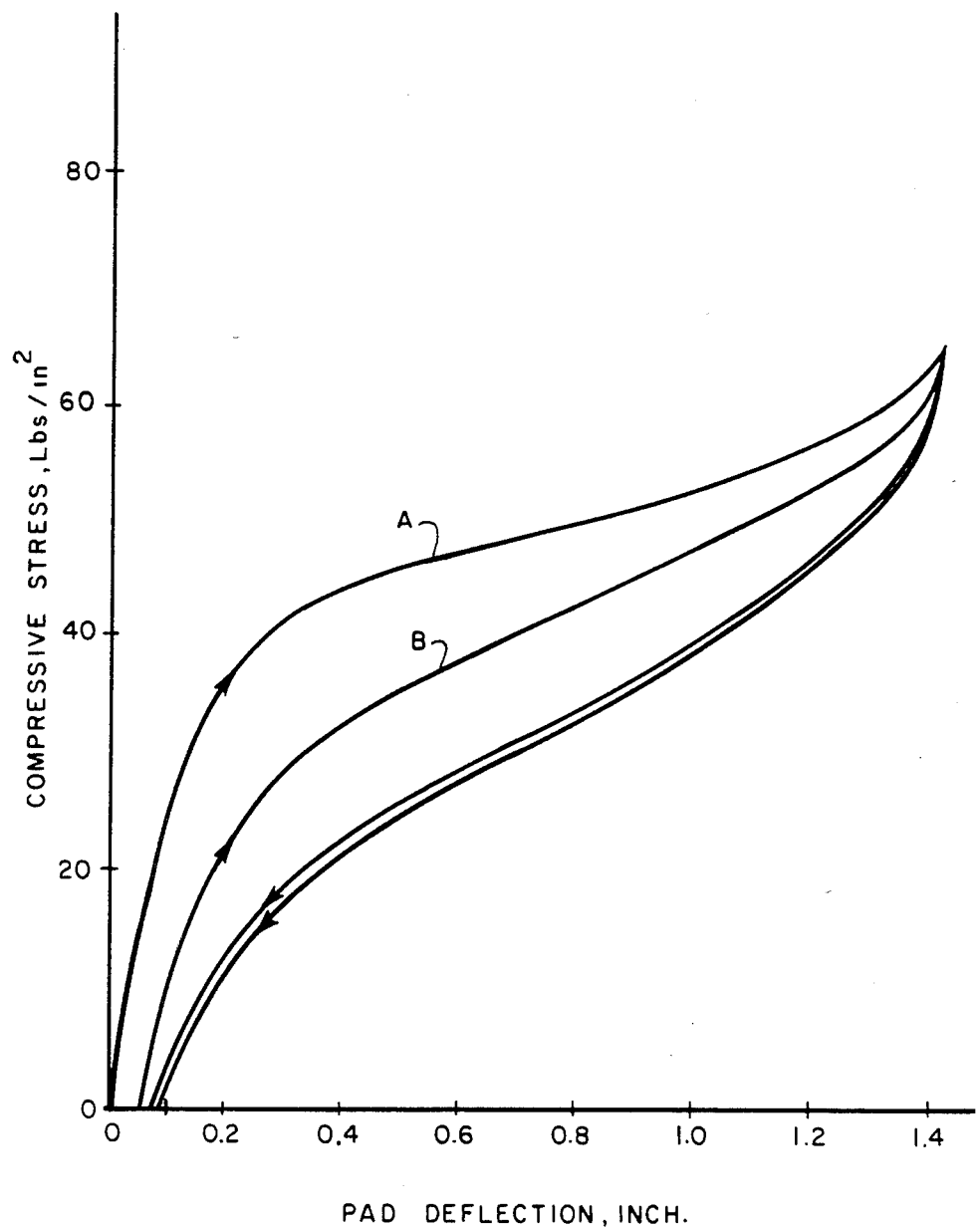
FIG. 3 shows a compression-deflection graph for one formulation of the shock isolator pads of this invention, where the rate of compression is 2 in./min.

As can be seen, from these data and FIG. 3, the shock isolator pad had outstanding flexibility, moderate rigidity and would be especially useful to mitigate shock during missile transport and launch firing, and at all other times, such as during explosions or earthquakes, especially for land based missiles of the MX (Peacekeeper) type.

We claim:

1. A highly resilient polyurethane elastomer structural member, comprising the cured admixture of:
   (A) about 6.6 to about 7.2 parts by weight of a polyurethane prepolymer prepared from a composition consisting essentially of:
      (1) 2.60 moles to 2.80 moles of 4,4'-diphenylmethane diisocyanate, (2) about 0.23 mole to about 0.31 mole of a low molecular weight triol having from 5 to 8 carbon atoms, and (3) 1.0 mole of polyoxytetramethylene glycol, with (B) 1.0 part by weight of a hydroquinone di-(β-hydroxyethyl)ether acting as a chain extender.

2. The structural member of claim 1, where the triol is selected from the group consisting of trimethylol ethane, trimethylol propane, trimethylol butane, trimethylol pentane and mixtures thereof, and the structural member is characterized as being highly flexible.

3. A highly resilient polyurethane elastomer structural member in circumferential contact with a launchable missile, comprising the cured admixture of:

(A) about 6.6 to about 7.2 parts by weight of a polyurethane prepolymer prepared from a composition consisting essentially of:

(1) 2.60 moles to 2.80 moles of 4,4'-diphenylmethane diisocyanate, (2) about 0.23 mole to about 0.31 mole of a low molecular weight triol selected from the group consisting of trimethylol ethane, trimethylol propane, trimethylol butane, trimethylol pentane and mixtures thereof, and (3) 1.0 mole of polyoxytetramethylene glycol, with (B) 1.0 part by weight of hydroquinone di-(β-hydroxyethyl)ether acting as a chain extender.

4. The structural member of claim 3, where the triol is trimethylol propane, and the structural member is characterized as being highly flexible.

5. The structural member of claim 3, mounted as a shock isolator pad line on a missile.

6. The structural member of claim 4, mounted as a shock isolator pad liner on a launch tube surrounding a missile.

7. The structural member of claim 3, wherein the triol is trimethylol propane having three hydroxy methyl groups attached to the same carbon atom.

8. The structural member of claim 3 attached to a launchable missile having a bottom firing end and disposed inside a launch tube, said structural member being a shock isolator pad liner, said liner circumferentially contacting the inside of the launch tube and being effective to support the missile in an aligned position and provide shock mitigation generated during firing of the missile.

9. The structural member of claim 7 attached to a launchable missile having a bottom firing end and disposed inside a launch tube, said structural member being a shock isolator pad liner, said liner circumferentially contacting the inside of the launch tube and being effective to support the missile in an aligned position and provide shock-mitigation generated during firing of the missile.

* * * * *